(12) United States Patent
Hsu

(10) Patent No.: US 6,945,395 B2
(45) Date of Patent: Sep. 20, 2005

(54) CD STORAGE CASE

(75) Inventor: Nick Hsu, Taichung (TW)

(73) Assignee: Synchro Ent. Co., Ltd., Taichung (TW)

( * ) Notice: Subject to any disclaimer, the term of this patent is extended or adjusted under 35 U.S.C. 154(b) by 134 days.

(21) Appl. No.: 10/667,444

(22) Filed: Sep. 23, 2003

(65) Prior Publication Data

US 2005/0061690 A1 Mar. 24, 2005

(51) Int. Cl.[7] .................. B65D 85/57; A47G 19/08; A47B 47/00
(52) U.S. Cl. ............. 206/308.1; 206/311; 211/41.12; 211/195
(58) Field of Search ................ 206/308.1, 308.3, 206/309, 311, 312, 307.1; 220/6; 211/40, 41.12, 195, 43; 312/9.1, 9.58

(56) References Cited

U.S. PATENT DOCUMENTS

| | | | | |
|---|---|---|---|---|
| 1,113,608 A | * | 10/1914 | Franks | 220/6 |
| 3,235,038 A | * | 2/1966 | Nesslinger | 182/62.5 |
| 3,897,871 A | * | 8/1975 | Zinnbauer | 206/564 |
| 5,085,329 A | * | 2/1992 | Crowell et al. | 211/195 |
| 6,299,011 B1 | * | 10/2001 | Rosenfeldt | 220/4.29 |

* cited by examiner

*Primary Examiner*—Jim Foster
*Assistant Examiner*—Faye Francis
(74) *Attorney, Agent, or Firm*—Dennison, Schultz, Dougherty & MacDonald

(57) ABSTRACT

A CD storage case has two holders and two racks mounted between the holders. The racks between the holders could be folded inside the holders. When no CD cases put on the CD storage case, the racks could be folded to decrease whole volume.

5 Claims, 7 Drawing Sheets

CD STORAGE CASE

BACKGROUND OF THE INVENTION

1. Field of the Invention

The present invention relates to a CD storage case, and more particularly to a CD storage case that can foldable storage and decrease storage volume.

2. Description of Related Art

With reference to FIG. 7, a conventional CD storage case has an outer case (40) and a rack (41). The case (40) is rectangle and has a cavity (not numbered), an inside bottom surface (not numbered) and an opening (not numbered). The rack (41) is mounted on the inside bottom surface and inside the inside cavity. The rack (41) has multiple recesses (42) parallel formed on the rack (41). When using the conventional CD storage case, each CD box (30) is inserted into each recess (42) and is hold to stand firmly. However, the conventional CD storage case has following disadvantages:

1. Because the shape of the conventional CD storage case is fixed, the conventional CD case takes more space to stored.

2. Also, the conventional CD storage case is not convenient to carry because of its volume.

To overcome the shortcomings of conventional CD storage case, the present invention provides a CD storage case to mitigate or obviate the aforementioned problem.

SUMMARY OF THE INVENTION

The primary objective of the present invention is to provide a CD storage case has two holders and two racks mounted between the holders. The racks between the holders could be folded inside the holders. When no CD cases put on the CD storage case, the racks could be folded to decrease whole volume.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
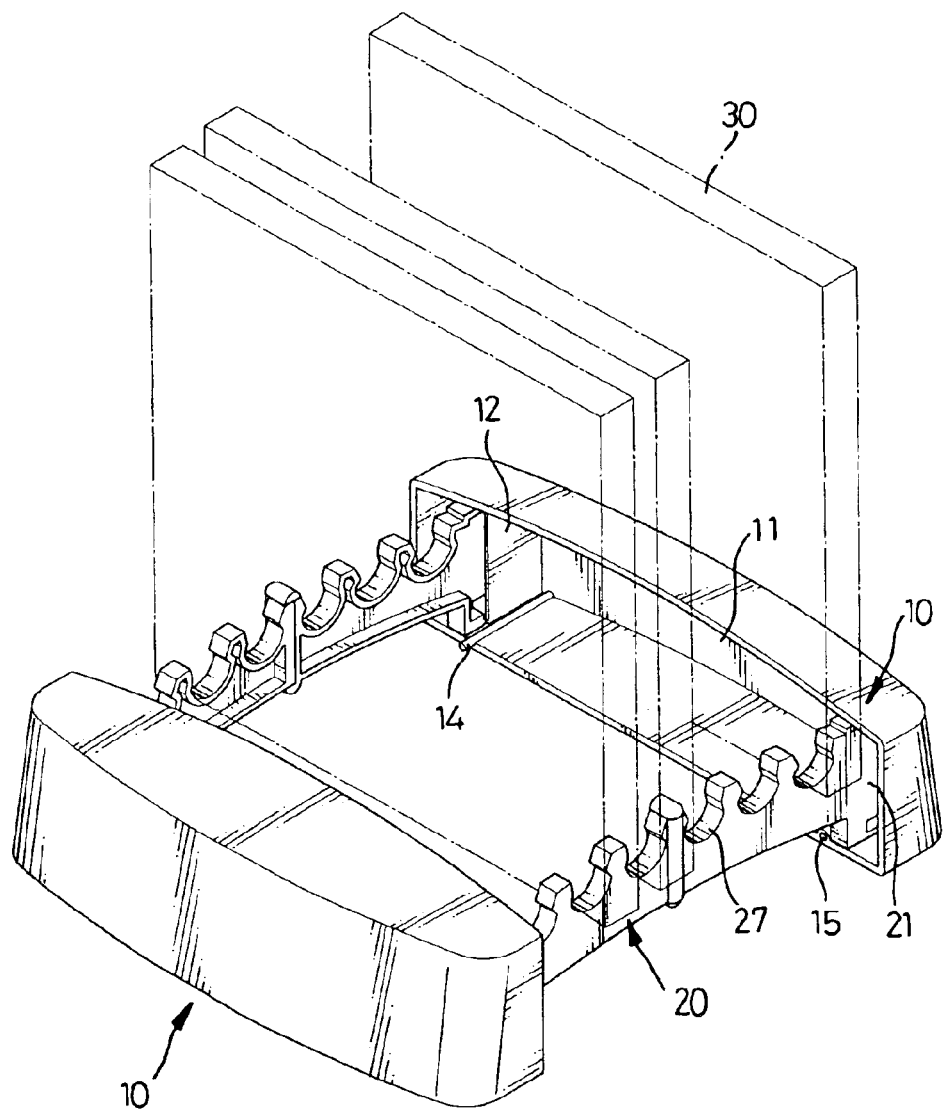
FIG. 1 is a perspective view of a first embodiment of a CD storage case in accordance with the present invention.
Figure 2:
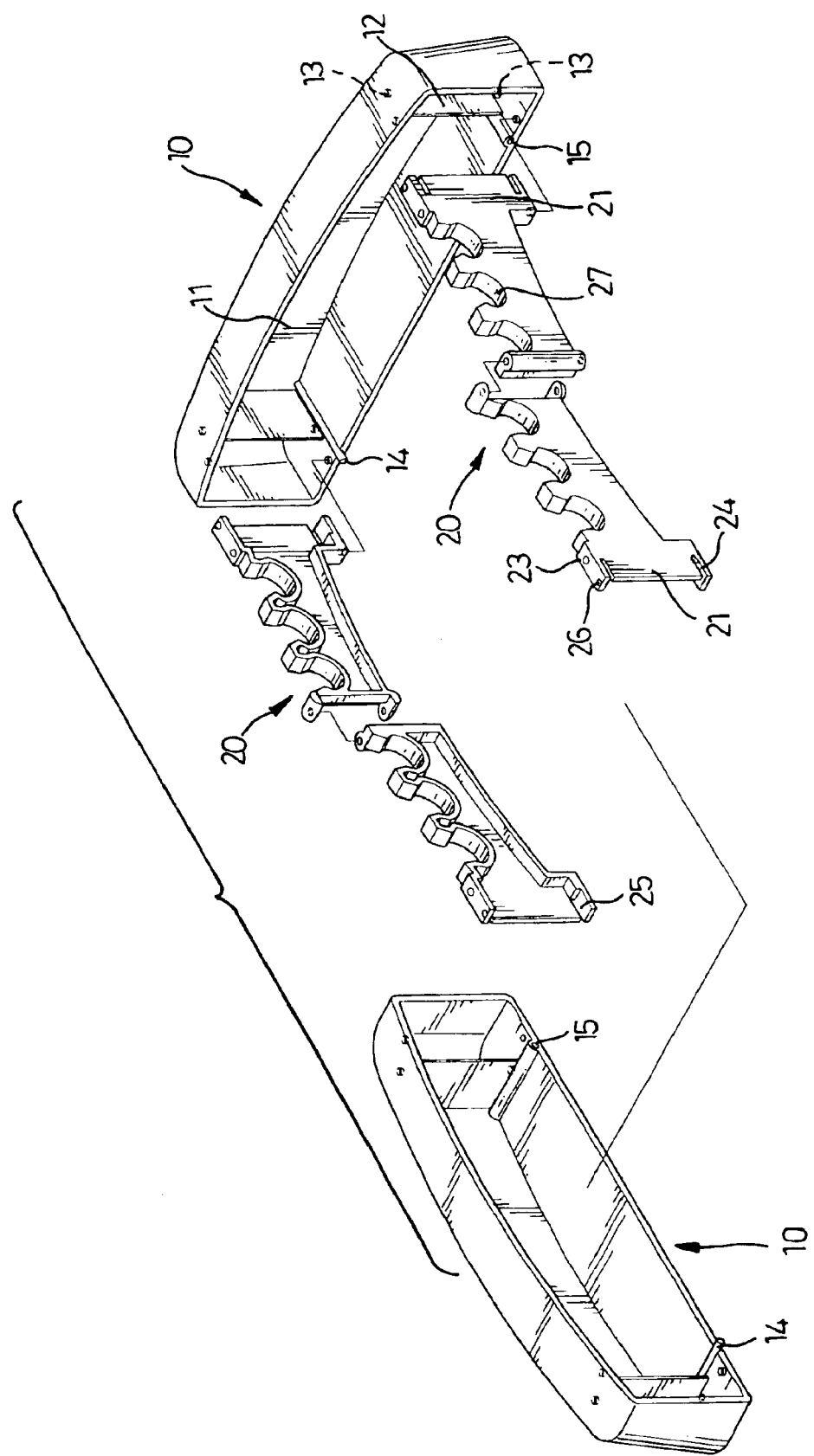
FIG. 2 is an exploded perspective view of the CD storage case in FIG. 1.

With reference to FIGS. 1 and 2, a CD storage case of a first embodiment in accordance with the present invention has two holders (10) and two racks (20).

Each of the holders (10) faces each other and has a cavity (not numbered), an opening (not numbered), a sidewall (not numbered), two lateral side walls (not numbered), a top surface (not numbered), a bottom surface (not numbered), a bottom edge (not numbered), two stops (12), two pivot holes (not numbered), four locating holes (13) and a locking device (not numbered). The stops (12) are formed inside the cavity from the inside top surface to the inside bottom surface and respectively near two lateral side walls. Two of the locating holes (13) are respectively defined on the inside top surface and inside bottom surface. Each locating hole (13) is defined beside one of the stops (12) and respectively near the sidewall and the lateral side wall. Two of the locating holes (13) are respectively defined on the top surface and the bottom surface. Each pivot hole is defined near the opening and respectively near the lateral side walls. The locking device comprises a stub (14) and a hole (15). The stub (14) is formed on the bottom edge near one of the lateral side walls, the hole (15) is defined on the bottom edge near the other lateral side wall. When the holders (10) abut together, the stub (14) on one of the holder (10) could insert into the hole (15) on the other holder (10).

The racks (20) has two brackets (not numbered) and each rack (20) has a distal end (not numbered), a proximal end (not numbered), a middle portion (not numbered), a top side (not numbered), multiple recesses (27), a pivot portion (not numbered) and two connected portions (21). The connected portions (21) are defined on the distal end and the proximal end of the rack (20). The pivot portion is defined on the middle portion of the rack (20). Each connected portion (21) has a free end (not numbered), a top side (not numbered), a bottom side (not numbered), two pivot posts (23) and two protrusions (26). The protrusions (26) are respectively formed on the top side and the bottom side of the connected portion (21) near the free end. The pivot posts (23) are respectively formed on the top side and the bottom side of the connected portion (21), beside the protrusion (26) and away from free end. Each connected portion further comprises two slots (24) defined transversely through the connected portion and respectively near the top side and the bottom side so that the resilient pieces (25) are formed.

The multiple recesses (27) are formed on the top side of the racks (20). The pivot portion is formed between two brackets. The pivot portion comprises a spindle (not numbered) and a spindle bracket (not numbered). The spindle is formed on one of the brackets. The spindle bracket is defined on the other bracket and mounted on the spindle.

Figure 3:
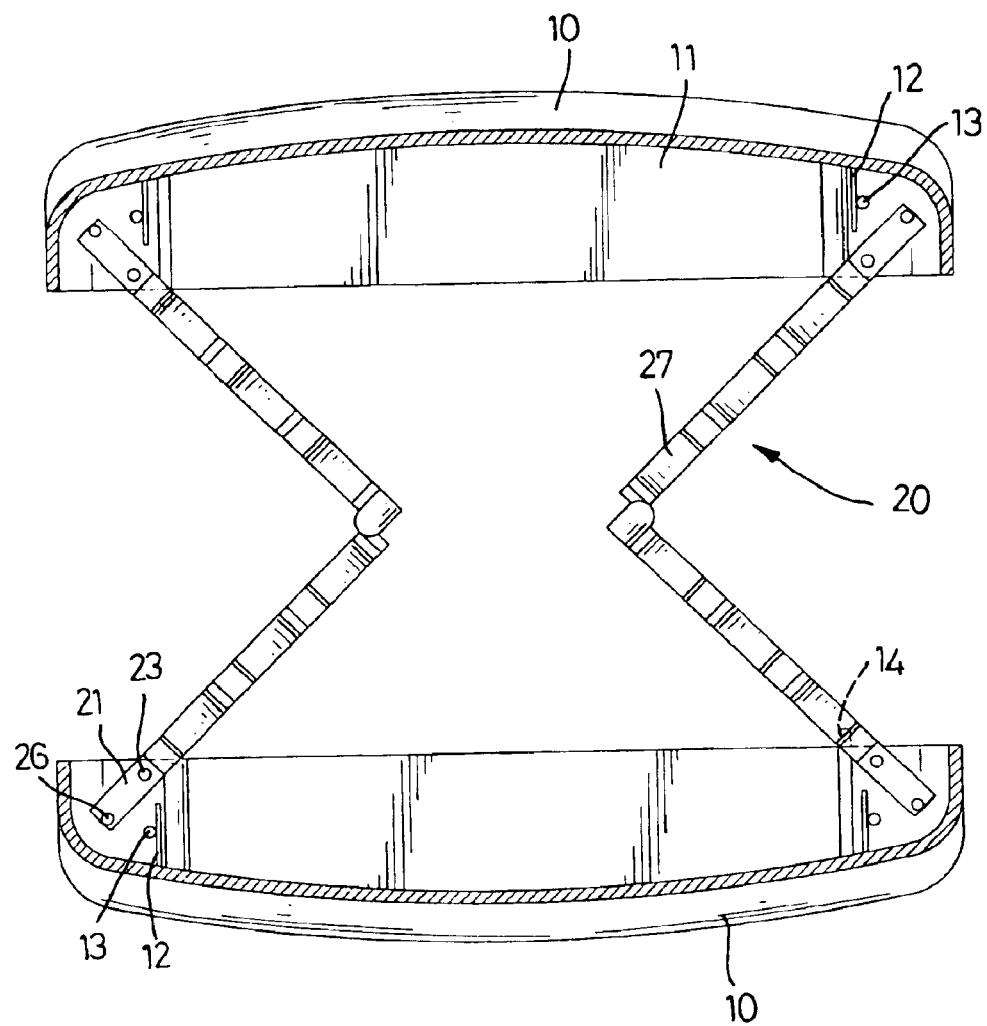
FIG. 3 is a top plan view in partial section of the CD storage case in FIG. 1.

With reference to FIG. 3, when pull the holders (10) out, the brackets of the rack (20) be extended straight, the protrusions (26) will move into the locating holes (13) so that the racks (20) will not be folded again. Furthermore, the resilient pieces (25) formed on the connected portions provide a resilient force to protrusions (26) so that the action of the racks (20) could be smooth.

Figure 4:
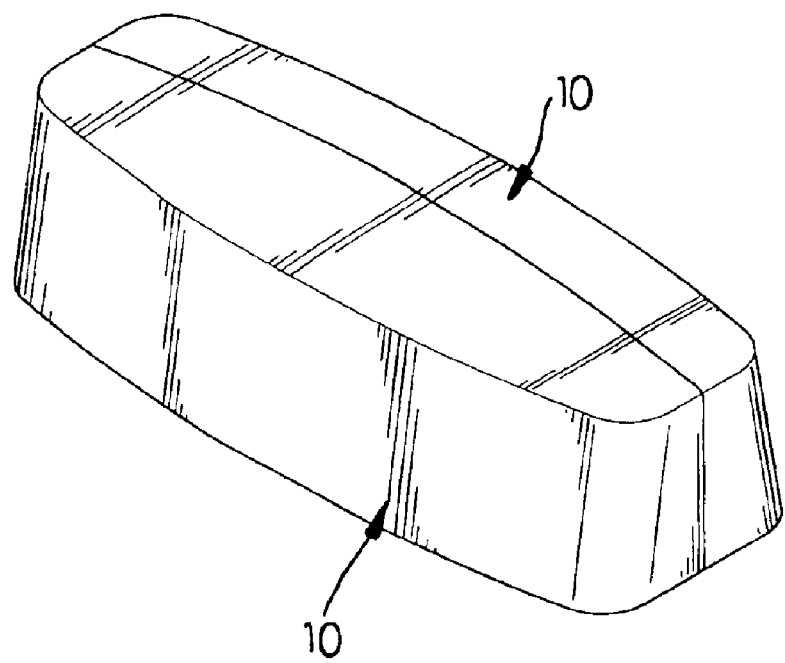
FIG. 4 is a perspective view of the CD storage case in FIG. 1 when the CD storage case is closed.
Figure 5:
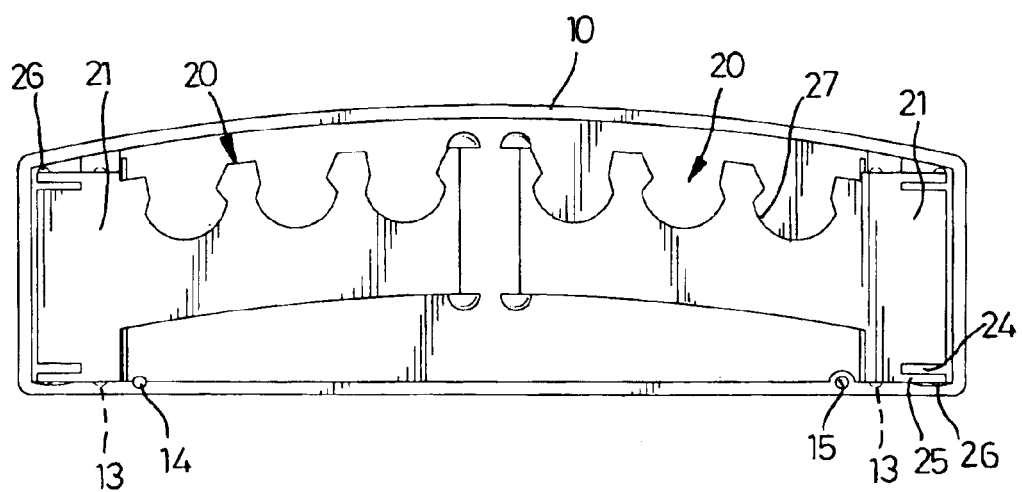
FIG. 5 is a side plan view of the CD storage case in FIG. 1.

With reference to FIGS. 4 and 5, when the holders (10) abut together, whole the racks (20) can be folded between the holders (10). The racks (20) can be folded because of the pivot portions defined between the brackets. When no CD cases on the recesses (27), the holders (10) CD storage case could be abutted together. Whole the volume of the CD storage case will decrease and become easily stored or carry.

Figure 6:
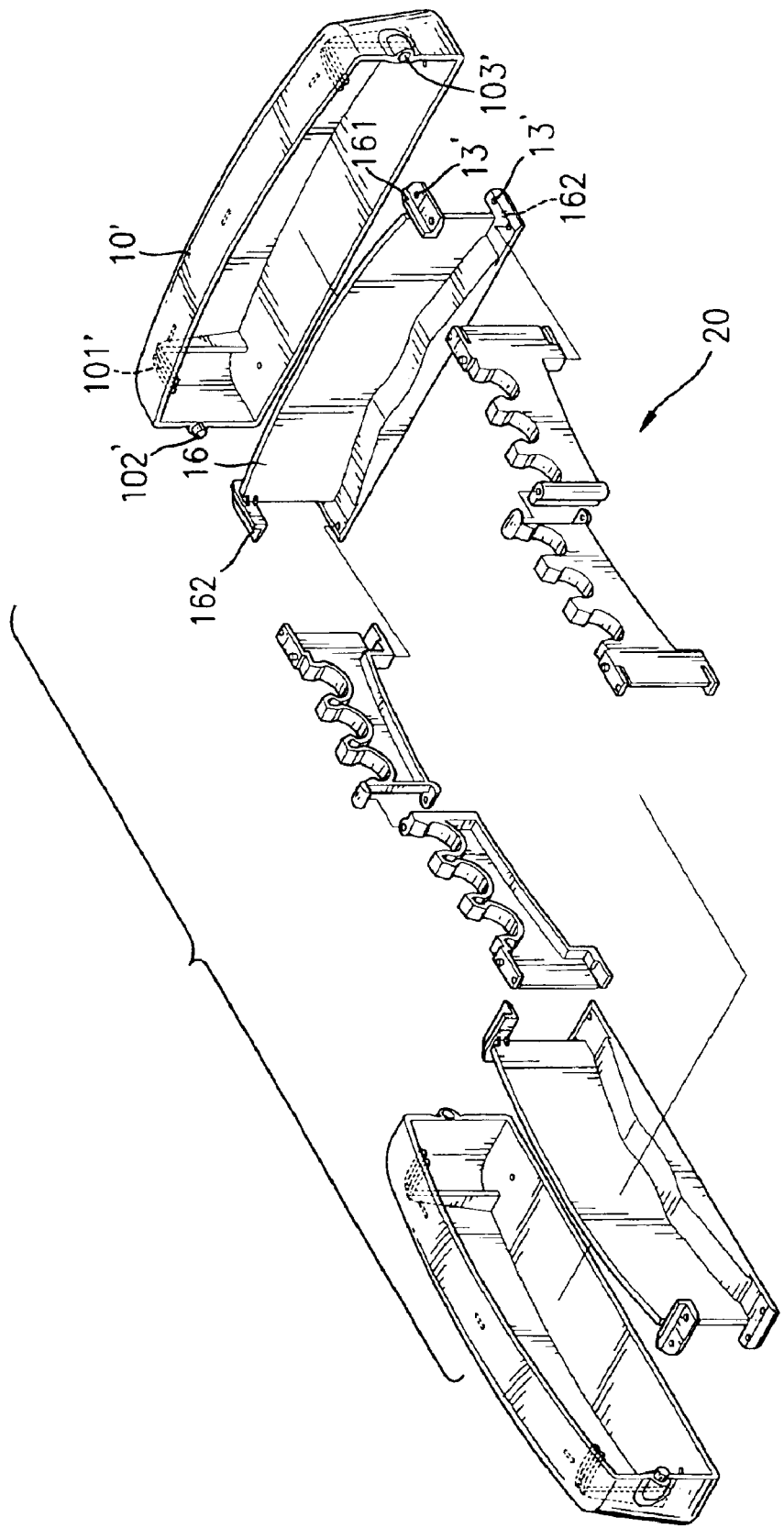
FIG. 6 is an exploded perspective view of a second embodiment of the CD storage case in accordance with the present invention.
Figure 7:
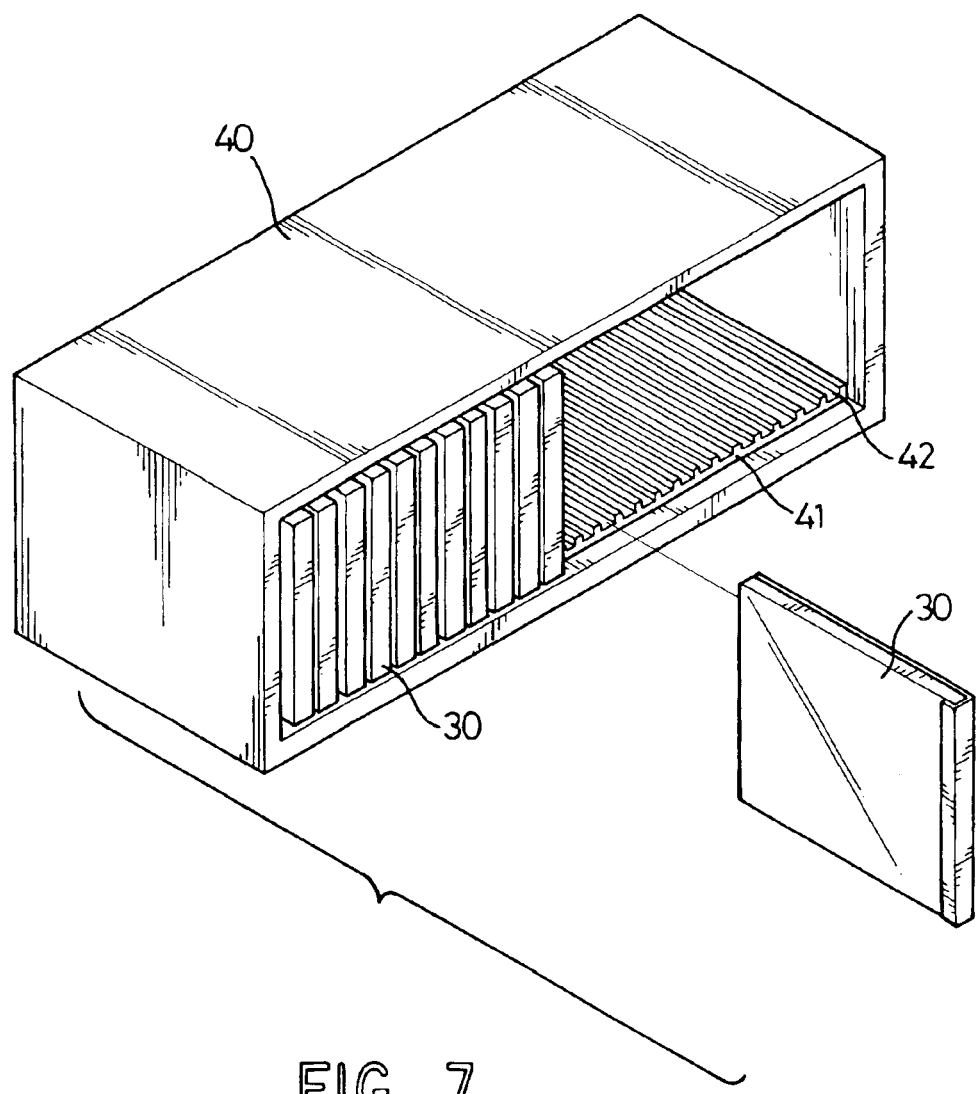
FIG. 7 is a perspective view of a conventional CD storage case in accordance with the prior art.

With reference to FIG. 6, the CD storage case of a second embodiment in accordance with the present invention has a similar structure as that of the first embodiment shown in FIG. 1 and will not describe again except to notice the specific changes in the second embodiment.

The storage case in the second embodiment of the present invention further comprises two holding trays (16) and each holding tray (16) is received inside one of the holders (10').

Each holder (10') has two keyways (101') formed on the top surface and respectively near the lateral side walls. The lateral side walls respectively has a stub (102') and a hole (103'). The stub (102') is formed on one of the holder (10') and faces the hole (103') on the other holder (10').

Each holding tray (16) has a top surface (not numbered), four corners (not numbered), four extended wings (162) and two keys (161). The keys (161) are formed on the top surface and movable received inside the keyways (101'). The extending wings (162) are transversely formed at the corners, respectively. Two locating holes (13') are defined in each respective extending wing (162). When the holding trays (16) are detachably mounted inside the holders (10'), the racks (20) are pivotally hold by the locating holes (13') in the extending wings (162). Because the holding trays (16) are detachably mounted inside the holders (10'), the CD storage case can be easily assembled.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A CD storage case comprising
   two holders; and
   two racks pivotally mounted between the holders and each rack having at least two brackets pivoted with each other, and each rack having
   a distal end;
   a proximal end;
   a middle portion;
   a top side;
   a bottom side;
   two connected portions defined on the distal end and the proximal end of the rack;
   a pivot portion defined on the middle portion of the rack; and
   multiple recesses formed on the top side of the bracket.

2. The CD storage case as claimed in claim 1, wherein each connected portion comprises
   a free end;
   a top side;
   a bottom side;
   two protrusions respectively formed on the top side and bottom side and near the free end; and
   two pivot posts respectively formed on the top side and the bottom side and away from the free end; and
   each holder further comprises
   a cavity;
   an opening;
   a top surface;
   a bottom surface;
   two locating holes respectively defined on the top surface and the bottom surface and corresponding to the protrusions; and
   two pivot holes respectively defined on the top surface and the bottom surface and corresponding to the pivot posts.

3. The CD storage case as claimed in claim 2, wherein each connected portion further comprises two slots defined transversely through the connected portion and respectively near the top side and the bottom side.

4. The CD storage case as claimed in claim 1, wherein the pivot portion of each rack comprises a spindle and a spindle bracket, the spindle is defined on one of the bracket, and the spindle bracket is defined on the other bracket and mounted on the spindle.

5. The CD storage case as claimed in claim 1 further comprising two holding trays respectively mounted on the holders, each holding tray having
   a top surface;
   two keys formed on the top surface;
   four corners; and
   four extended wings each transversely formed at one of the corners,
   wherein each respective extending wing has two locating holes defined in the extended wing; and
   each holder further comprises:
   two keyways formed on the top surface and receiving the keys on a corresponding one of the holding trays; and
   a stub and a hole respectively formed on the lateral side wall, wherein the stub of one of the holders faces the hole in the other holder.

* * * * *